C. E. BROWN.

Calipers.

No. 48,257.

Patented June 20, 1865.

Witnesses
Wm Trewin
Theo Lusch

Inventor
Clarence E. Brown
per Munn & Co
attorneys

UNITED STATES PATENT OFFICE.

CLARENCE E. BROWN, OF FLORENCE, MASSACHUSETTS.

IMPROVEMENT IN CALIPERS.

Specification forming part of Letters Patent No. 48,257, dated June 20, 1865.

*To all whom it may concern:*

Be it known that I, CLARENCE E. BROWN, of Florence, in the county of Hampshire and State of Massachusetts, have invented a new and useful Improvement in Calipers; and I do hereby declare that the following is a full, clear, and exact description thereof, which will enable others skilled in the art to make and use the same, reference being had to the accompanying drawings, forming part of this specification, in which—

Figure 1:
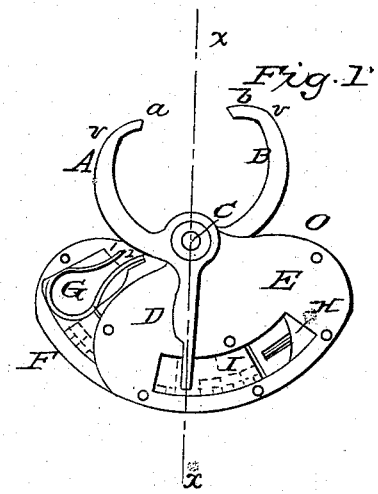
Figure 2:
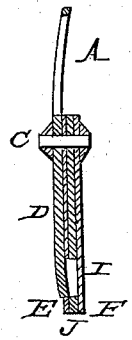
Figure 3:
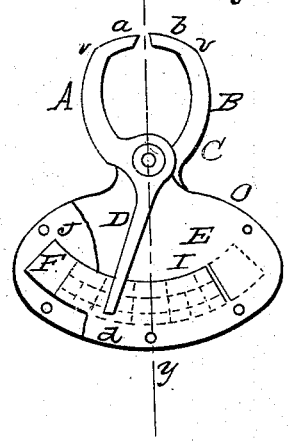
Figure 4:
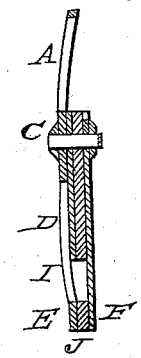

Figure 1 represents a calipers made according to my invention, the shell E being pushed a little one side to show the scale beneath. Fig. 2 is a vertical section taken on the line $x$ of Fig. 1. Fig. 3 is a calipers in which the scale is adjusted in a different way. Fig. 4 is a vertical section thereof, taken on the line $y$ of Fig. 3.

Similar letters of reference indicate like parts.

This invention consists in making a self-adjusting self-registering calipers. Its points project toward each other from the ends of its legs, and the line of their projection is in the arc of a circle drawn from the center of the calipers, so that the near of the points does not shorten the radius.

A scale for indicating the measurement is attached to the body of the instrument, and it is made movable therein, so as to enable one to adjust it to a new position as the points of the legs wear away. The calipers shown in Figs. 1 and 3 are each made according to my invention, the difference between them being one of modification only, and consisting in the manner of adjusting the movable scale, as hereinafter explained.

A B are the legs of the instrument. In the self-registering instruments now commonly used each leg is curved from its center of motion to its point, and the scales which indicate their measurement are calculated for the diameter which they measure when new and unworn; but it is evident that when their points wear off their radius is shortened and their measurement is thenceforth incorrect.

The object of my invention is to make an instrument which will not be liable to this fault.

A B are the legs of the calipers, united upon a pivot, C. From the points of the legs I extend them, as shown at $a$, upon a curved line, which coincides with the arc of a circle described from their center of motion C. The length of the curved ends $a$ will vary with the size of the instrument. The effect of this construction is to secure accuracy, because so long as the radius of the legs remains the same, which will be until the curved ends $a$ are worn away to the points V, so long will the capacity of the instrument be the same.

D is an index, made by continuing the leg A below the pivot C. It is so constructed and applied as to traverse the face of a frame, O, which extends on that side of the center C which is opposite the calipers. The frame O is composed of the outer plates, E F, and of an inner plate, J, which separates the outer plates and forms a bed to receive the movable scale I. The leg B of the calipers is fixed to the inner plate, and is consequently immovable. The frame O is curved in its outlines, its lower side being curved concentrically with an arc described by the index D. The scale I is curved with like concentric lines, and is fitted in a curved slot made for it in the inner plate, J, and which is to be of greater length than the scale to admit of its movement to and fro therein. The outer plate, E, is also slotted, so as to expose the face of the scale, as shown in the drawings.

The scale is to be graduated in the way commonly practiced in making self-registering calipers, and the index D extends nearly across the slot in the plate E, and so indicates by its position over the scale the measurement made by the calipers. When the wear of the points of the calipers makes the index to register or mark an erroneous measure upon the scale I correct the error by moving the scale toward the left a sufficient distance to compensate for their wear. In the example shown in Fig. 3 I have shown a curved scale fixed in a curved slot formed in the inner plate, J, and held by friction between the outer plates, E and F. When the scale is moved in any direction it will be held stationary by the pressure of the said plates, the parts being constructed so as to produce that result. The scale is moved automatically by the index to its correct position toward the left by striking against a pin, $d$, which rises from the face of the scale, and which is so placed on the scale as to bring it against the index D when the calipers is closed.

Instead of using friction for holding the scale to its new position, it may be held by means of a screw and spring at opposite ends, as shown in the example of my invention set forth in Fig. 1, where a spring, G, is placed in a chamber formed for it in one end of the plate J, its ends being held in slots 1 2. A screw, H, passes through the edge of the plate, at its opposite end, into the slot which receives the scale, and bears against the right-hand end of the scale, forcing it up to and holding it against the spring. In this mode of adjusting the scale the screw must be advanced against the scale a sufficient distance to compensate for the wear of the calipers.

I am aware that it is common to make calipers with curved ends or with legs each constituting an arc of a circle. This, therefore, I do not claim.

I claim as new and desire to secure by Letters Patent—

1. Attaching a movable scale to a calipers, substantially as and for the purpose above described.

2. Constructing a registering-calipers so as to be self-adjusting by means of its index and a pin upon the movable scale, substantially as above described.

CLARENCE E. BROWN.

Witnesses:
CHARLES E. MILLARD,
CHARLES STRONG.